United States Patent [19]

Bull et al.

[11] Patent Number: 4,954,556
[45] Date of Patent: Sep. 4, 1990

[54] WATER-BASED INK COMPOSITIONS

[75] Inventors: Larry J. Bull, Marietta, Ga.; Raymond Sieradzki, North Huntingdon; Kurt G. Olson, Gibsonia, both of Pa.

[73] Assignee: PPG Industries, Inc., Pittsburgh, Pa.

[21] Appl. No.: 439,013

[22] Filed: Nov. 20, 1989

Related U.S. Application Data

[63] Continuation of Ser. No. 123,627, Nov. 23, 1987, abandoned.

[51] Int. Cl.$^5$ .............................................. C08K 5/06
[52] U.S. Cl. ..................................................... 524/378
[58] Field of Search ......................................... 524/378

[56] References Cited

U.S. PATENT DOCUMENTS

| | | | |
|---|---|---|---|
| 3,208,965 | 9/1965 | Kuhne | 524/378 |
| 4,001,159 | 1/1977 | Imai et al. | 524/378 |
| 4,384,661 | 5/1983 | Page et al. | 524/378 |

FOREIGN PATENT DOCUMENTS

| | | | |
|---|---|---|---|
| 0140223 | 5/1985 | European Pat. Off. | 524/377 |
| 0001232 | 1/1978 | Japan | 524/378 |
| 6118445 | 9/1981 | Japan | 524/378 |
| 0065766 | 4/1982 | Japan | 524/377 |
| 0015461 | 1/1984 | Japan | 524/378 |
| 0217278 | 10/1985 | Japan | 524/378 |

Primary Examiner—Joseph L. Schofer
Assistant Examiner—J. M. Reddick
Attorney, Agent, or Firm—Godfried R. Akorli

[57] ABSTRACT

Disclosed herein are water-based ink compositions comprising an emulsion polymer and a rewetting agent comprising a substantially high amount of a surfactant.

6 Claims, No Drawings

WATER-BASED INK COMPOSITIONS

This application is a continuation of application Ser. No. 07/123,627, filed Nov. 23, 1987 now abandoned.

BACKGROUND OF THE INVENTION

The present invention relates to water-based ink compositions. More specifically, the present invention relates to water-based ink compositions comprising emulsion polymers and rewetting agents.

BRIEF DESCRIPTION OF THE PRIOR ART

Emulsion polymers have been suggested for use in water-based ink compositions. High glass transition temperature (Tg) acrylic emulsion polymers, for example, have been considered to be useful because of their tendency to dry quickly. In applications, such as gravure printing, which is of a particular interest here, ink compositions containing the high Tg acrylic emulsion polymers tend to dry too quickly. Because of their poor rewettability, ink compositions containing the high Tg acrylic emulsion polymers tend to permanently dry in cells of gravure cylinders and, consequently, exhibit poor ink transfer to substrates.

The prior art has, in the main, employed cosolvents or neutralized acid-containing oligomeric materials in solving the "dry in" problems. This approach, in turn, seems to adversely affect the rate of drying of the printed ink. By the present invention, there is provided rewettable water-based ink compositions containing emulsion polymers which transfer well and dry quickly on paper to exhibit good printability.

SUMMARY OF THE INVENTION

In accordance with the foregoing, the present invention encompasses water-based ink compositions containing a binder which comprises a water-based polymer, in combination with an effective amount of a rewetting agent comprising a substantial amount of a surfactant in order to impart ink and water rewettability to the composition and, optionally, containing an aqueous solution resin. The term "rewetting", or "rewettability", as used herein, is defined as the ability of the ink to redisperse in itself and water after a partial or complete drying.

In the present embodiment of the invention, the binder is an emulsion polymer, preferably with a high glass transition temperature (Tg) of about 50° C. to 120° C. The rewetting agent is described herein as a surfactant, preferably a nonionic surfactant, which is present in a substantial amount from about 10 to 50 percent by weight based on the total resin solids content of the ink composition.

It has been found that by employing a high Tg anionic acrylic latex and a surfactant in an effective amount, there is imparted to a water-based ink composition the desirable properties of ink and water rewettability and fast drying. The ink composition of this invention can be printed at high-press speed without permanently drying in the cells of a gravure cylinder. Thus, transfer of the ink composition to the substrate is not adversely affected. Moreover, the printed inks dry in an appreciably short period of time without curling. By "curling" is meant distortion of an unrestrained sheet of paper due to differences in coating from one side to the other.

DETAILED DESCRIPTION OF THE INVENTION

The principal ingredients of the water-based ink composition of this invention are a water-based polymer, a rewetting agent comprising a substantial amount of surfactant, and, optionally, an aqueous solution resin. In the present embodiment of the invention, the water-based polymer is an emulsion polymer. Typically, the Tg of the useful polymer should be above the application temperature of the water-based ink compositions containing said polymer. In gravure printing, for example, the Tg should be above the temperature of the gravure cylinder.

Illustrative examples of the emulsion polymer are aqueous addition polymers such as acrylic or vinyl emulsion polymers. They can be prepared by the free-radical addition polymerization of ethylenically unsaturated monomers. Generally, the monomers are selected on the basis of the resultant polymer having a Tg greater than about 20° C. and preferably from about 50° C. to 120° C. or higher. Preferably, the Tg of the emulsion polymer is greater than 90° C.

Non-limiting examples of the useful monomers can be acrylic or methacrylic acid esters of cyclic or polycyclic alcohols, e.g., isobornyl acrylate and isobornyl methacrylate; acrylic acid or methacrylic acid ester, methyl methacrylate; and vinyl monomers such as styrene, methyl styrene, vinyl toluene, vinyl acetate, vinyl chloride, vinylidene chloride and the like. In an illustrative embodiment of this invention, a high Tg monomer, such as methyl methacrylate, can be polymerized with other functional monomers to impart the desired properties.

The emulsion polymers can be prepared by conventional free radical-initiated emulsion polymerization techniques in which the acrylic or vinyl monomers are dispersed in an aqueous medium in the presence of an emulsifier.

Examples of free-radical initiators are those which are water soluble, e.g., peroxides, such as hydrogen peroxide, and ionic types such as ammonium persulfate sodium or potassium persulfate.

Examples of the emulsifiers can be surfactants; preferably, ionic surfactants are employed. A nonionic surfactant can be employed as well, preferably in combination with an ionic surfactant. The ionic surfactant can be anionic or cationic and it is preferably water soluble. The amount of the ionic surfactant that is used varies primarily with regard to its type, the type of nonionic surfactant that is in combination therewith, the selection of the monomers, the relative proportions of the monomers, and other factors such as the desired particle size of the resultant latex. Typically, the total amount of the ionic surfactant, useful herein as an emulsifier, is between 0.25 to 5 percent by weight based on the total weight of the monomers and preferably within the range of from about 0.5 to 3 percent by weight based on the total weight of the monomers.

Illustrative examples of the anionic surfactants, useful herein, as emulsifiers can be alkyl- or aralkyl-sulfates, sulfonates, phosphates, and carboxylates. Illustrative examples of the cationic surfactants, useful herein, can be an amine salt employing counter-ions derived from strong acids, such as hydrochloric acid, or other acids, such as alkyl sulfonic acid, e.g., methanesulfonic acid, and phosphorous-containing acids, such as phosphoric acid, phosphorous acid, Illustrative examples of the nonionic surfactants, useful herein, can be alkyl polyoxyalkylene polyether, alkylaryl polyoxyalkylene polyether, polyvinyl alcohol and propylene oxide-ethylene oxide block copolymers of the nonionic surfactants, useful herein, can be alkyl polyoxyalkylene polyether, alkylaryl polyoxyalkylene polyether, polyvinyl alcohol, propylene oxide, and ethylene oxide blocked copolymers.

Optionally, chain transfer agents, such as alkyl mercaptans, such as 1-dodecanethiol, tertiary-dodecyl mercaptan, isooctylthioglycolate, and chlorohydrocarbons, such as chloroform, can be used.

The free-radical emulsion polymerization techniques, which can be employed, can be of a continuous monomer feed, semi-continuous monomer feed, pre-emulsion and/or seeding. The resultant latex can be crosslinked or uncrosslinked and have a solids content of about 10 to 65 percent by weight and a particle size of about 500 to 5000 angstroms. Characteristically, the useful emulsion polymers typically have a solids content greater than 20 percent with a viscosity less than 50 poises.

The "rewetting agent" is employed in an effective amount to impart ink and water rewettability without compromising fast dry of the printed ink, in particular, and other desirable properties, generally. In the present embodiment of the invention, the rewetting agent comprises an inordinately high amount of surfactant. The total surfactant content of the water-based ink compositions is from about 10 to 50 percent and preferably from about 15 to 30 percent based on total resin solids including weight of the surfactant. It is a distinct characteristic of the water-based ink compositions of the present invention to employ inordinately high amounts of surfactants. Ordinarily, for reasons of foaming and water sensitivity of coalesced films, the high amount of surfactants employed herein would have been considered prohibitive in normal applications of emulsion polymers. Surprisingly, the present invention has employed a substantially high amount of surfactant to produce rewettable ink compositions that dry quickly upon printing. Hence, there is provided herein an improvement in water-based ink compositions of the type described herein. The improvement comprises including therein the substantial amount of surfactants as a rewetting agent.

The rewetting surfactant, useful herein, can be characterized as that which retains water solubility after volatiles have been removed therefrom under service conditions of the ink compositions containing the same. Generally, the more hydrophilic surfactants are preferred. The useful surfactant can be ionic (i.e., anionic and cationic) or nonionic and preferably a combination of ionic and nonionic surfactants. Examples of the useful surfactants can be the same as the surfactants which are useful as an emulsifier as described hereinabove.

In the practice of the invention, some or all of the surfactants can be present as an emulsifier or stabilizer for the emulsion polymer as described herein. Typically, some of the surfactants are employed during polymerization and the additional surfactants can be added during the formulation of the water-based ink compositions. For example, some of the additional surfactants can be employed in preparing the ink varnish or pigment base of the ink ingredients.

In preparing the water-based ink compositions, there is optionally employed an "aqueous solution resin" which provides a means for improving solids content, printability, hold out, gloss, and, to some extent, rewettability. A non-limiting example of the aqueous solution resin is a water-solubilized malleinized rosin of malleinized rosin ester, water-soluble acrylic polymers, polyesters or polyurethanes. The resin solution can be prepared by at least partially neutralizing, in water, in the presence of a base such an amine. With regard to the optional aqueous solution resin, the term "solution" can be used interchangeably herein with a dispersion and a colloid. The aqueous solution resin can be employed in an amount of about 0 to 25 percent and preferably about 5 to 15 percent by weight based on resin solids.

In preparing the water-based ink compositions of this invention, there is also employed organic or inorganic pigment or mixtures thereof, and typical ink additives, such as waxes, defoamers, extenders and the like; the rest of the ink compositions comprise water. The percent by weight solids of the emulsion polymer is from about 10 to 30 percent and preferably from about 15 to 25 percent by weight based on the total ink compositions. The percent by weight pigment is from about 2 to 12 percent and preferably from about 3 to 9 percent of the total ink composition.

The resultant ink composition can be printed at high-press speed without permanently drying in the cells of a gravure cylinder. This and other aspects of the invention are further illustrated by the following non-limiting examples.

EXAMPLE A

The following is an example of the high Tg anionic acrylic polymer of this invention:

Reactor Charge

| Ingredients | Parts by weight (grams) |
| --- | --- |
| Deionized water | 774.7 |
| SIPEX UB[1] | 5.0 |
| Sodium bicarbonate | 0.5 |
| AEROSOL MA 80[2] | 5.2 |

Feed I

| Ingredients | Parts by weight (grams) |
| --- | --- |
| Deionized water | 100.0 |
| Potassium persulfate | 4.0 |

Feed II

| Ingredients | % by Weight | Parts by Weight (grams) |
| --- | --- | --- |
| Methyl methacrylate | 54.1 | 841.2 |
| Styrene | 39.6 | 612 |
| 2-Ethylhexyl acrylate | 5.4 | 77.9 |
| Methacrylic acid | 0.9 | 15.0 |
| 1DT[3] | — | 4.0 |
| Deionized water | — | 775.2 |
| IGEPAL CO 897[4] | — | 80 |
| SIPEX UB | — | 20.2 |

-continued

Feed II

| Ingredients | % by Weight | Parts by Weight (grams) |
|---|---|---|
| AEROSOL MA 80 | — | 20.4 |

[1]Sodium lauryl sulfate (30% active), available from ALCOLAC.
[2]Dihexyl sodium sulfosuccinate (80% active), available from American Cyanamide Company.
[3]1-dodecanethiol.

Feed III

| Ingredients | Parts by Weight (grams) |
|---|---|
| Deionized water | 200.4 |

In a properly equipped reaction vessel, the reactor charge was heated under a nitrogen blanket to 78° C. and 49.5 grams of Feed B was added thereto. Feed A was then added and the reaction mixture was held for 30 minutes at 82° C. Thereafter, the addition of the rest of Feed B was commenced and conducted for over three hours Feed C was then added to the resultant mixture which was held for one hour at 80° C. and then cooled. Analysis: 46.9 percent solids (at 105° C. for two hours); acid as 4.30, Particle size was 1,110 angstrom.

EXAMPLE B

An ink composition was formulated with the above acrylic latex, in a blending varnish which was prepared with the following:

| Ingredients | Parts by Weight (grams) |
|---|---|
| The above latex | 75 |
| Aqueous solution resin[1] | 17 |
| JOHNWAX 26[2] | 7.5 |
| FOAMKILL 649[3] | 0.5 |

[1]Thirty percent fumaric modified pentaerythriol ester of rosin (available from FRP Products as FILTREZ 5015), which is neutralized with 7 percent morpholine and dispersed in a mixture of 20 percent isopropanol and 43 percent water.
[2]A wax, available from S. C. Johnson & Sons.
[3]A defoamer, available from Crucible Company.

EXAMPLE C

An ink composition, in accordance with this invention, was formulated with the following:

| Ingredients | Parts by Weight (grams) |
|---|---|
| Blending varnish[1] | 59.5 |
| Blue pigment base[2] | 11.0 |
| Red pigment base[3] | 1.0 |
| Clay | 9.0 |
| Urea | 3.0 |
| MAZAWET DF[4] | 4.0 |
| IGEPAL CO-897 | 1.0 |
| FOAMKILL 649 | .5 |
| Water | 11.0 |

[1]As prepared above.
[2]SUNSPERSE BLUE BHD-6017 from Sun Chemical Corporation.
[3]RD-5000 LIQUAFLEX RED (Ba lithol) from Drew Chemical Corporation.
[4]Alkyl polyoxyalkylene from Mazer Chemical Corporation.

ADDITIONAL EXAMPLES

The following examples of the water-based ink compositions claimed herein and comparative examples relating thereto further illustrate the present invention. The water-based ink compositions were formulated in essentially the same manner as described in Example C except for the noted variations. Tables I–III, hereinbelow, show, respectively, variations in the polymer (in the blending varnish), the surfactant for rewetting and the aqueous solution resin. In each instance the ink composition (based on the acrylic latex of Example A) demonstrated an improved drying rate while maintaining both good ink and water rewettability. The results are as shown in the tables below.

TABLE I

| Examples | Polymer (in blending varnish) | Ink Rewettability[4] | Water Rewettability[4] | Drying Rate % Change[5] |
|---|---|---|---|---|
| 1 | Acrylic Latex of Example A | Yes | Yes | Control |
| 2 | Joncryl 134[1] | Yes | Yes | +26 |
| 3 | UCAR 4550[2] | Yes | Yes | +18 |
| 4 | Geon 460 × 6[3] | Yes | Yes | 0 |

[1]A 95° C. Tg acrylic latex, available from S. C. Johnson & Sons Company.
[2]A 27° C. Tg acrylic latex, available from Union Carbide Corporation.
[3]A 73° C. Tg vinyl chloride latex, available from B. F. Goodrich Corporation.
[4]Water wettability is measured by drawing down the ink on a 0.2-mil wedge plate, followed by drying the ink for two minutes under ambient conditions. An ink drop was applied to the dried ink and after an additional 30 seconds, the wedge plate was rinsed with water. Ink rewettability is indicated by an essentially clean area where the ink drop was placed; dried ink would remain on the wedge plate. Water rewettability is indicated by essentially complete removal of ink from the wedge plate.
[5]Drying rate was determined by comparing each sample to the control, drawing them down side-by-side on a split grind gauge. Dry time for the test was defined as the time required for surface dry of a film 0.8 mils thick as indicated by a visual loss of gloss. Control dry time was 100 ± 15 seconds with about four percent difference as a measure of error in the test.

TABLE II

| | | Surfactant Variation | | |
|---|---|---|---|---|
| Examples | Surfactant | Ink Rewettability | Water Rewettability | Drying Rate % Change |
| 6 | MAZAWET DF[1] | Yes | Yes | Control |
| 7 | IGEPAL CO 430[2] | Yes | Yes | +16 |
| 8 | MAZAWET DOSS[3] | Yes | Yes | +20 |
| 9 | KATAPOL PN-430[4] | Yes | Yes | +26 |
| 10 | PPG 1025[5] | Yes | No | +27 |
| 11 | CARBOWAX 1000[6] | Yes | Partial | Not measurable |
| 12 | No surfactant | Yes | Partial | Not measurable |

[1]Alkyl polyoxyalkylene surfactant from Mazer Chemical Corporation.
[2]Polyoxyethylated nonylphenol surfactant from GAF Corporation.
[3]Sodium dioctyl sulfosuccinate solution (70%) from Mazer Chemical Corporation.
[4]Polyoxyethylated alkyl amine surfactant from GAF Corporation.
[5]Polypropylene oxide polymer from Union Carbide Corporation.
[6]Polyethylene oxide from Union Carbide Corporation.

TABLE III

Solution Resin Variation

| Examples | Polymer Acrylic[1] Latex Example A | Polymer Joncryl[1] 134 | Aqueous[2] Solution Rosin | Jonwax 26 | FOAMKILL 649 | MAZAWET DF | Ink Rewettability | Water Rewettability | Drying Rate % Change |
| --- | --- | --- | --- | --- | --- | --- | --- | --- | --- |
| 13 | 75 | — | 17 | 7.5 | 0.5 | 5 | Yes | Yes | +22 |
| 14 | — | 75 | 17 | 7.5 | 0.5 | 6 | Yes | Partial | +20 |

[1]Polymers of the blending varnish.
[2]The aqueous solution resin, used herein, was 30 percent solids solution of Joncryl 680 in ammonia water with 6.7 percent of ethanol.

We claim:

1. A water-based fast-drying ink composition comprising:
   (a) a water-based polymer prepared by an emulsion polymerization technique, having a Tg of about 50° C. to 120° C. or higher,
   (b) a surfactant in an amount of about 15 to 50 percent by weight solids of the ink composition.

2. The composition of claim 1 wherein the water-based polymer is an emulsion polymer of solids content greater than 20 percent by weight and a viscosity of less than 50 poises.

3. The composition of claim 2 wherein the emulsion polymer is prepared by free radical-initiated polymerization of ethylenically unsaturated monomers.

4. A composition of claim 3 wherein the surfactant comprises an anionic surfactant in combination with a nonionic surfactant.

5. The composition of claim 4 wherein the nonionic surfactant is an alkyl polyoxyalkylene polyether or alkylaryl polyoxyalkylene polyether.

6. The composition of claim 1 wherein the surfactant is present in an amount of 15 to 30 percent by weight based on total resin solids.

* * * * *